US012763072B2

(12) United States Patent
Kramer et al.

(10) Patent No.: US 12,763,072 B2
(45) Date of Patent: Oct. 13, 2026

(54) ACTIONING CLASSIFICATION OF A TELECOMMUNICATIONS NETWORK CALL

(71) Applicant: MICROSOFT TECHNOLOGY LICENSING, LLC, Redmond, WA (US)

(72) Inventors: Yuval Kramer, Cambridge (GB); Tingmao Wang, Cambridge (GB); Alice Rose Twist, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 332 days.

(21) Appl. No.: 18/649,953

(22) Filed: Apr. 29, 2024

(65) Prior Publication Data

US 2025/0336395 A1 Oct. 30, 2025

(51) Int. Cl.

*G10L 15/00* (2013.01)
*G06F 16/683* (2019.01)

(Continued)

(52) U.S. Cl.

CPC .......... *G10L 15/183* (2013.01); *G06F 16/685* (2019.01); *G10L 15/16* (2013.01); *G10L 15/22* (2013.01); *G10L 15/30* (2013.01); *H04M 3/2281* (2013.01); *H04M 3/42221* (2013.01); *H04M 2201/40* (2013.01)

(58) Field of Classification Search

CPC ....... G10L 15/16; G10L 19/005; G10L 19/00; G10L 25/27; G10L 25/30; G10L 15/12; G10L 15/02; G10L 15/063; G10L 15/07; G10L 15/20; G10L 15/22; G10L 15/26; G10L 15/30; G10L 15/1822; G10L 15/183; G10L 15/193; G10L 15/19; G10L 17/18; G10L 15/1815; H04M 3/2281; H04M 3/42221; H04M 3/436; H04M 2201/40;

(Continued)

(56) References Cited

U.S. PATENT DOCUMENTS

2019/0373111 A1 12/2019 Rute

OTHER PUBLICATIONS

Extended European search report received for European Application No. 25171729.4, mailed on Aug. 22, 2025, 09 pages.

(Continued)

*Primary Examiner* — Vu B Hang
(74) *Attorney, Agent, or Firm* — Han Gim; Newport IP, LLC

(57) ABSTRACT

A call is classified in a telecommunications network. A transcript of the call is accessed and an embedding vector of the transcript is computed. A database of embedding vectors is searched for a first embedding vector with a defined degree of similarity to the embedding vector of the transcript. Each embedding vector represents an example text associated with a known classification. A first prompt is constructed that comprises: an instruction directed to a large-language model to classify the call using a first example; the transcript; and the first example that includes example text represented by the first embedding vector and the associated known classification. The techniques further comprise prompting the large-language model with the first prompt; receiving a response to the first prompt from the large-language model, comprising a classification of the call; and, in response to the classification meeting a criterion, initiating an action at the telecommunications network.

20 Claims, 10 Drawing Sheets

(51) Int. Cl.
*G10L 15/16* (2006.01)
*G10L 15/183* (2013.01)
*G10L 15/22* (2006.01)
*G10L 15/30* (2013.01)
*H04M 3/22* (2006.01)
*H04M 3/42* (2006.01)

(58) Field of Classification Search
CPC .... H04M 2203/558; H04M 2203/6027; G06F 16/685
See application file for complete search history.

(56) References Cited

OTHER PUBLICATIONS

Milios, et al., "In-Context Learning for Text Classification with Many Labels", In Repository of arXiv:2309.10954v2, Dec. 6, 2023, 11 Pages.

ACTIONING CLASSIFICATION OF A TELECOMMUNICATIONS NETWORK CALL

BACKGROUND

Fraudulent calls placed over telecommunication networks have continued to grow in number, and a recipient of a fraudulent call may fall victim to fraudulent obtaining of personal data, unauthorized transfer of money, or another scam. Classifying a call as fraudulent using a database of suspicious telephone numbers is in an approach used to alert a user of a scam or otherwise reduce risks associated with the scam. However, such methods are defeatable using telephone number spoofing, and constructing a database of all suspicious telephone numbers is difficult.

The examples described below are not limited to implementations which solve any or all of the disadvantages of known classification methods and systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer-implemented method is disclosed for classifying a call in a telecommunications network. A transcript of the call is accessed and an embedding vector of the transcript is computed. A search is done in a database of embedding vectors, to find a first embedding vector with a defined degree of similarity to the embedding vector of the transcript. In the database each embedding vector represents an example text with a known classification. A first prompt is constructed. The first prompt comprises: an instruction directed to a large-language model to classify the call using the transcript and a first example from the database. The first example is an example text represented by the first embedding vector; the first example has a known classification. The method further comprises prompting the large-language model with the first prompt and receiving a response to the first prompt from the large-language model. The response comprises a classification of the call. In response to the classification meeting a criterion, an action is initiated at the telecommunications network.

Prompting a large-language model to classify a call using an example with a predefined similarity to a transcript of the call counters the need to finetune a machine-learning model with thousands of training examples for a same accuracy and reduces processing, storage and memory requirements for prompting compared to using many examples in a predefined prompt which each are processed and stored. Accuracy of the classification is maintained, enabling an accurate action to be taken at the telecommunications network using less resources. This also allows deployment of the disclosed method on computing devices with less storage/memory availability than devices not using the disclosed technology.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1A:
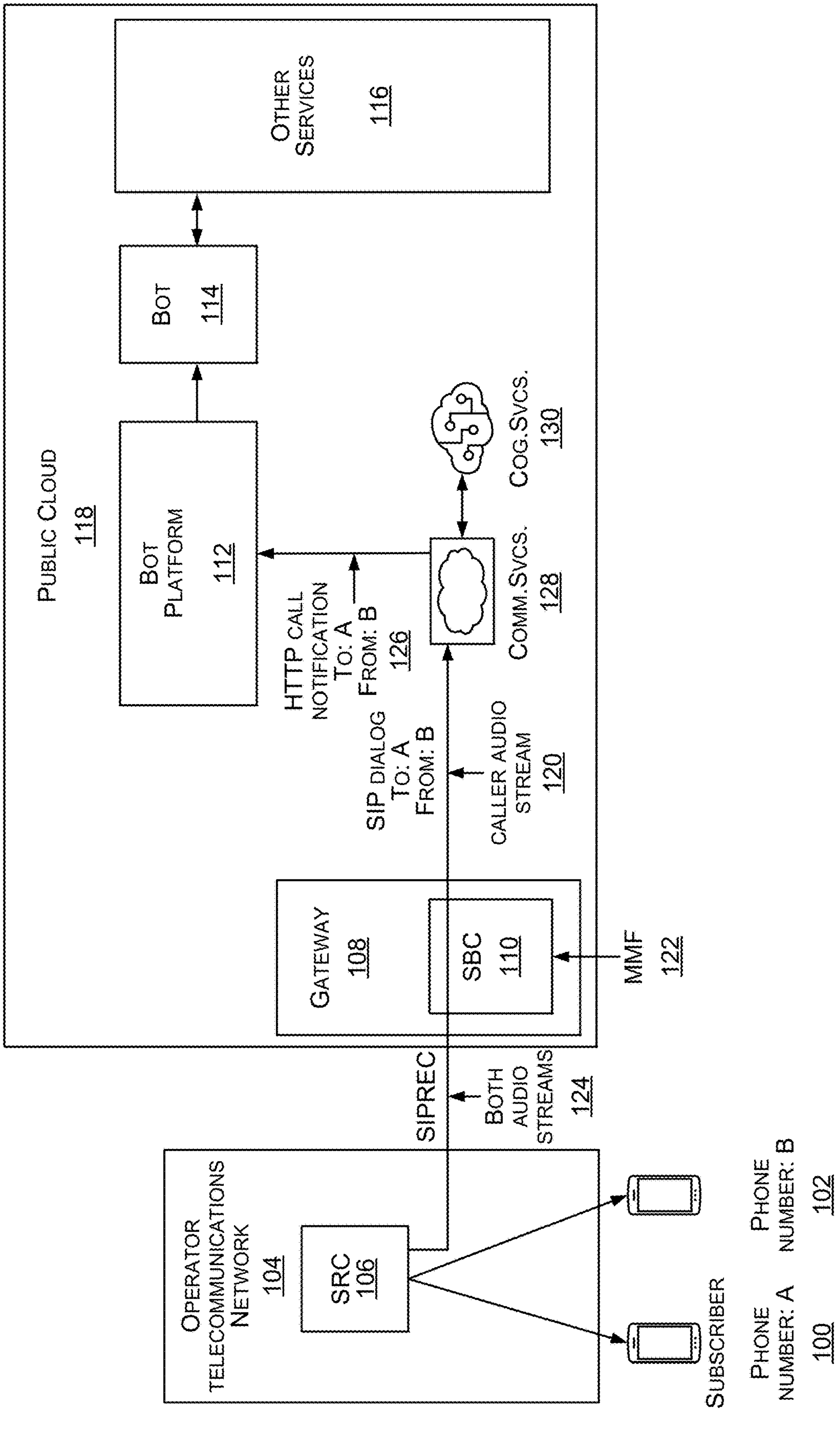
FIG. 1A illustrates a first exemplary architecture implementing the disclosed technology.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Although the present examples are described and illustrated herein as being implemented in a classification system with a telecommunications context, the system described is provided as an example and not a limitation. As those skilled in the art will appreciate, the present examples are suitable for application in a variety of different types of classification systems, including for example a help-bot context which provides responses to user input and classifies a call in order to accurately respond and/or take action to mitigate a user issue. A call describing an issue is in various examples classified as one of a plurality of defined issues, each with a known associated response to mitigate the issue, and the associated response is then for example initiated by the help-bot. Many other contexts in which an action is initiated in response to classifying a call are possible.

Classification may be applied in a wide variety of contexts, especially in a telecommunications context, and refers to the labelling of input data as one of a defined plurality of labels.

An approach to classification of a call uses an artificial intelligence model (such as a large language model (LLM)) which takes as input the data to be classified and determines a classification. However, finetuning the artificial intelligence model (for example a machine learning model or LLM) uses a large number of training examples, which is difficult to construct/collect and requires a large amount of computational resources including storage and/or memory and processing power. Additional training examples are also used to maintain the model as, for example, input data evolves. In the case of classifying a call as fraudulent or not in order to take action to lower a risk associated with a fraudulent call, for example, new types of fraudulent text are in some cases introduced over time, such as by scammers developing new techniques.

The present disclosure describes a way to counter the large amount of resources used for finetuning by prompting a large-language model, in various examples a generative pre-trained transformer model, using an example text and an associated known classification. The example text may be a transcript of a call and the known classification may be a label indicating the call as fraudulent or not. In the present technology, including a labeled example in a prompt, together with a transcript of a call to be classified, has a high impact on producing an accurate classification. In this way, the disclosed technology operates in an unconventional manner such that less computational resources are used to classify a call in a telecommunications network whilst maintaining accuracy. A prompt may comprise information about a call to be classified as well as examples, so that the LLM is given a task such as "Here are some examples from calls which are fraudulent and here are some examples from calls which are not fraudulent. In the light of the examples, classify the information about this new call as fraudulent or not." A number of possible examples in the prompt (and therefore that are processed and stored) is far lower than a number of examples used to finetune and train a machine learning model, for the same accuracy of classification. In this way, the disclosed classification method is implementable on a lower-powered computing device (with less memory, processing power and/or storage) than a device for fine-tuning a machine learning model using many training examples. Especially, where the LLM is a general model used for more than one purpose, finetuning the LLM for each purpose uses more resources for the same accuracy of classification compared to using the disclosed technology for classification and a same general LLM. Additionally, a greater influence on the LLM in terms of accuracy of its output classification is achievable using a same number of examples than if the examples were used to fine-tune the LLM in a training process. It is not essential to include both fraudulent examples and non-fraudulent examples in the prompt.

Additionally, the disclosed technology comprises computing an embedding vector of a transcript representing a call to be classified, and searching in a database of embedding vectors, each embedding vector representing an example text associated with a known classification, for a first embedding vector with a defined degree of similarity to the embedding vector of the transcript. A first prompt is then constructed comprising: an instruction directed to a large-language model, instructing the large-language model to classify the call represented by the transcript using a first example, the transcript, and the first example, the first example being an example text represented by the first embedding vector and the known classification associated with the example text represented by the first embedding vector. The large-language model is then prompted with the first prompt, and a response received to the first prompt from the conversational large-language model, the response comprising a classification of the call.

In this way, a limited number of examples are determined and used to construct the prompt relative to many examples that are used in an approach where a static prompt is directed to a model, the static prompt comprising a range of possible examples (each example being a text and its known classification) and the transcript to be classified. For an accurate classification, the static prompt approach uses a range of examples covering many different possible input transcripts.

As the disclosed technology searches for an example with a defined degree of similarity to the text to be classified, the number of examples in the prompt (and therefore that are processed and stored) is enabled to be far lower than a number of examples in a static prompt covering all possible examples, whilst maintaining accuracy of classification. In this way, the disclosed classification method operates in an unconventional manner to be implementable on a lower-powered computing device (with less memory, processing power and/or storage) than a device using a static prompt. Additionally, the disclosed technology improves the functioning of an underlying computing device by reducing the amount of storage used for a prompt and reducing the amount of processing power and/or time used to construct the prompt, enabling more efficient operation when classifying a call. Where the large-language model is prompted via a network, for example where it is located in the cloud, the disclosed technology further reduces the network bandwidth used to prompt the large-language model to classify the call.

Moreover, the disclosed technology operates in an unconventional manner to reduce resources used by a device on which the LLM is situated. As the computational cost (for example the number of calculations performed) of performing an operation using the LLM increases as a number of tokens in a prompt increases, reducing the size of a prompt compared to the static prompt approach reduces the computational cost of performing the classification using the LLM.

In an example wherein the disclosed method is for classifying a fraud level of a call, an approach uses a static prompt comprising examples of different types of fraudulent text, including examples of impersonation of a bank, impersonation of a loved one, phishing targeted at bank details, phishing targeted at personal information, and other examples. When an additional fraudulent technique is found, an example is added to the prompt, making it larger in terms of storage and processing power used to construct and initiate the prompt.

In this example, if the transcript represents a call from a bank, a prompt is enabled to be constructed that comprises an example of an impersonation of a bank but that does not comprise an example of impersonation of a loved one. The prompt is therefore more relevant to the input transcript (the transcript associated with the call to be classified) than if it comprised an example describing impersonation of a loved one. Classification whilst maintaining accuracy and reducing resources used for the prompting and therefore the classification is therefore enabled.

Finally, the disclosed method comprises, in response to the classification received in the response to the first prompt meeting a criterion, optionally initiating an automated action at the telecommunications network. In this way, a remedial action to reduce a risk associated with the classification of the call is enabled to be taken. Overall, the disclosed technology reduces resources used to classify a call in a telecommunications network and therefore initiate action at the telecommunications network, whilst maintaining accuracy of the classification and therefore the action taken.

As mentioned herein, a large-language model is a well-known technology and is a model that performs natural language processing techniques. Such a large-language model as defined herein is in various examples a conversational large-language model, which is a large-language model that is queried using a prompt in natural language. A prompt, as mentioned herein, is a query directed to a large-language model, where the large-language model responds to the prompt in accordance with well-known methods. For example, a prompt instructing the large-language model to classify a text is responded to with the classification of the text, noting that the response is in some cases customized by instructing the large-language model via the prompt to respond in a certain way. In various examples, a large-language model is prompted using an Application Programming Interface (API), and the response is received in response to an API call representing the prompt. In various examples, the prompt comprises an instruction such as 'Classify the call represented by transcript A as Class 1 or Class 2. Examples of each class are Example 1 and Example 2 respectively.', accompanied by 'Class 1: Fraudulent', 'Class 2: Not Fraudulent', 'Example 1: Please give us your security code', and 'Example 2: I am calling to check in'. It should be appreciated that this is merely exemplary and that any other choice of classes, examples, and language is in various examples used.

Additionally, processing power, as mentioned herein, refers to the ability of a processor to perform a task, in various examples referring to a number of operations per second that a processor is capable of.

The disclosed technology is used to classify a call in a telecommunications network.

FIG. 1A illustrates a first exemplary architecture in which the disclosed technology is able to classify a call in a telecommunications network. A subscriber phone 100 of the operator telecommunications network 104, being for example an IP Multimedia Core Network Subsystem (IMS) network, receives a phone call from phone 102. The call is routed through a Session Recording Client (SRC) 106, which provides access to the call (transmitting audio streams associated with the call 124) using, for example, Session Recording Protocol (SIPREC); a well-known concept.

Audio streams from the call 124 are routed through Session Border Controller (SBC) 110, acting as a gateway 108 to public cloud 118. SBC 110 regulates communications flows between the operator network 104 and the public cloud 118. In various examples, in response to the audio streams 124 comprising two audio streams, one from the caller 102 and one from the callee 100, the SBC 110 runs a Message Manipulation Framework MMF 122 which strips the callee's audio stream and leaves only the caller's audio, assuming that the caller is a potential scammer and that classification of the call as fraudulent or not is desired. MMF 122 also, in various examples, encodes caller and callee numbers, session case (call direction), and desired voice artificial intelligence (AI) service (for example for text-to-speech conversion) in RFC3261 Session Initiation Protocol (SIP) signaling with a User-to-User Information (UUI) header.

The SBC 110 then forwards the call 120 to communications services 128, which receive a call with caller and callee numbers.

In various examples, a platform 112 is configured to execute bots (such as bot 114) and provide functionality that enables telecommunications operators to create cloud-based services 116 that interact with phone calls and media streams running inside their core network 104. Such a bot platform in various examples includes reference applications (bot 114) that are customizable by telecommunications operators as needed. The disclosed architectures in various examples include call integration and call control, including over the call signaling and media mixing and stream access, and in some cases includes text-to-speech and speech-to-text conversion.

The disclosed technology is in various examples implemented by a cloud-based service provider. According to the described techniques, a transcript of a call in progress in a telecommunications network is accessible. In various examples, a transcript of a call is generated on call completion or at any time afterwards. In other examples, accessing the transcript of the call comprises accessing the call and, for a specified segment of the call, converting a sample of the call to text, as described herein. In various examples, only media flow of the call is accessed, and a transcript is generated using the accessed media flow according to the techniques disclosed herein. Such a transcript is then in various cases accessed.

In one example, subscriber 100 accesses platform 112 applications by explicitly dialing a Public-Switched Telephone Network (PSTN) number (either directly, or dialing into an existing multiparty call), or explicitly answering a call from the platform. In this form of call integration, a cloud provider hosts a PSTN number, and call control is performed within the cloud provider's communications services 128.

In another example, the platform 112 receives one-way pre-mixed media streams for selected phone calls from the operator network, and call integration is performed by an element in the operator network 104 with connectivity provided by the SBC 110, as shown in FIG. 1A.

In yet another example, call integration is performed by a component in the gateway 108, such as a Mobile Control Point (MCP) component, or in some cases is performed by an operator's existing Telephony Application Server (TAS) using an Open Mobile Alliance (OMA)-style Hyper Text Transfer Protocol (HTTP) Representational State Transfer (REST) interface. In an example, a call enters the operator network 104 and the MCP is invoked. The MCP calls a consultation Application Programming Interface (API) via a Control Plane API/Isolation Layer. A Control Plane API is a semantic API defining operations and events used to communicate with the operator network 104; for instance, "person X wants to invoke bot Y on call Z" in one direction, and "put person X on hold in call Y" in the other. A Control Plane Isolation Layer maps code to translate between the control plane API and the component performing the call integration. If a bot is to be invoked for the subscriber, a Temporary Routing Number (TRN) is returned. Information pertinent to the call is in some cases stored for later user (the assigned TRN, caller and callee details, etc.). If a bot is invoked, the MCP redirects the call to the TRN, and the call is routed to the communications services 128 using the SBC 110. Communications services 128 is a cloud service used for any of call control, media mixing, extraction and injection. Cognitive services 130 is a cloud service used herein for speech-to-text and text-to-speech conversion.

Communications services 128 correlate an incoming call with previously stored call information, and in various examples use a service that provides a notification 126 using HTTP requests of an event such as a call, to bot platform 112 and therefore bot 114.

Communications services in various examples include at least one of the following functions:

Termination of RFC 3261 SIP calls from the gateway 108, and exposing the signaling information to the platform 112—to/from, session case, and any UUI SIP headers. This enables the platform to determine which bot 114/service to invoke for each call.

Decoding of the media from the codec coming from the gateway 108 into Pulse Code Modulation (PCM) which in some cases is needed, for example, for speech-to-text. This also allows injection of media back into the call, for example audio sound effects or translated speech.

Depending on the use case of the bot 114, one or more of the following are performed:

Dial back out via the operator network 104 to the original intended target of the call.

Connect these two calls (the original call and the redirected target) to a communications services conference resource, thus establishing the originally intended 1-1 call.

Start performing speech-to-text on the call and pass input to the bot 114.

Instruct the communications services 128 to perform various call control actions.

Drop the bot 114 off the call.

In various examples, call control is performed by a gateway 108. In this case the MCP redirects the call to the gateway 108, and sets up another call to the original target and the gateway 108, and the gateway 108 conferences them together, therefore establishing the originally intended 1-1 call. When instructed the MCP sets up another call which is routed to the communications services 128 using the SBC 110, where the communications services 128 notify the platform 126 and the incoming call is correlated with previously stored call information. The call is anchored in the MCP with media mixing performed in the gateway 108. Depending on the bot use case, one or more of the following are performed:

Start performing speech-to-text on the call and pass input to the bot 114.

Instruct the MCP to perform various call control actions.

Instruct the MCP to drop the bot 114 off the call.

In another example, responsibility for call control is performed by the MCP or an operator's existing TAS using an OMA-styled HTTP REST interface. In an example, speech-to-text and text-to-speech processing are performed on-premises.

Text transcripts of a call are provided to bot 114 by communications services 128, and bot 114 then interfaces with other cloud services 116, according to the disclosed technology a large-language model, using the provided transcripts.

There is, in various cases, a platform-level configuration for invoking the bot 114: A voice call detection service is in various examples configured as the "default bot" and any call received by the platform which is not identified as a translation call is considered a voice call detection service call.

The voice call detection service in various examples listens to a single audio stream on terminating calls (the non-subscriber, i.e. potential scammer). The voice call detection service collects the call transcript throughout the call and periodically sends the transcript to a large-language model (LLM), in various examples a generative pre-trained transformer model such as an OpenAI Chat-GPT (trade mark) or any other LLM such as BLOOM, Mistral Large, Gemini, Llama, asking for a fraud assessment, resulting in, for example, a classification of good/suspect/gray area, which is provided in a response to the prompt. This collection and classification is in some cases configured (LLM model, timings, durations, thresholds, etc.).

In some examples, additional techniques are applied to perform fraud analysis, including using LLM analysis of call audio to make a determination of whether the caller/callee already know each other, and using a Machine Learning (ML) layer to screen call audio transcripts with certain characteristics in real-time, before only passing a subset to the LLM for further processing (e.g. to reduce processing costs).

In the case of suspect/gray area detections, or for any other classification, one or more target SMS numbers are in an example configured for notification. The notification is in some cases sent using the communications services 128 (e.g., from a configured alphanumeric sender ID). In one case, this is pre-defined warning text concatenated with justification from the LLM. Such justification is in various examples obtained by prompting the LLM that classified the call with an instruction to provide justification for the classification, the instruction in combination with or independent of the instruction to classify the call.

In some configurations, transcripts are sampled and stored, and/or retrieved and post-processed, for example to further investigate or assess the accuracy of the service.

In some examples, information regarding the potentially fraudulent call is provided to the network operator or other entity to provide additional opportunities for intervention. In one example, an API is provided so that entities such as a bank are provided timely information so that fraudulent transactions are preventable. The API in some cases provides or responds to a query to indicate that a customer of the bank is engaged in a potentially fraudulent situation.

The disclosed examples enable a service provider to access an active call, analyze the content of the call to determine risks, and to take proactive actions in response to the determination. The disclosed examples in some cases involve both incoming calls as well as outgoing calls, and in various cases are applied to individual users as well as larger scale users such as enterprises which in some cases involve different scripts and patterns. The analysis of a call is in some cases augmented by metadata, such as data that indicates that the caller is a known or regular caller which in one case reduces the risk that a call is fraudulent.

In various examples, the request to the LLM is a prompt requesting a classification of a probability that a call represented by an input transcript is fraudulent, which in some examples is used to determine a risk of fraud or a fraud level using a defined threshold or sensitivity. It should be appreciated that other types of outputs are in various examples requested, such as placing the result into one of at least one class (i.e. category). A fraud level as defined herein refers to a degree of fraudulence, for example 'fraudulent', 'not fraudulent', '50% confidence of being fraudulent', '75% chance of being fraudulent', '60% of the call is deemed fraudulent', or any other metric representing a fraud level.

In an example, the language model is further requested to provide a basis or reasoning for the classification or probability that is output by the conversational LLM. The basis or reasoning is used to inform the responsive action such as a notification that is provided to the subscriber or third party. In this way, users are helped to determine how to respond to the notification. For example, the call is placed on hold and a notification is provided to the subscriber so that the subscriber is enabled to determine whether to proceed with the call or terminate the call.

In an example, the voice call is divided into utterances. The end of an utterance in some cases is designated and a new utterance in some cases begins when a pause in the call is detected that exceeds some threshold such as a time threshold. A grouping of utterances is in various cases collected and sent to the language model for analysis. In an example, each utterance is sent for analysis. In some examples, every nth utterance is sent for analysis. In one example, a sliding window is implemented where the n most recent utterances are sent for analysis. The entire call is also sent in other cases. In some examples, longer transcripts are summarized or otherwise condensed before being analyzed.

In response to determining that a fraudulent call has been detected, the call is no longer analyzed and the focus shifts to responsive actions. Similarly, after a threshold amount of time, it is in some cases determined that a call is not fraudulent, and the call is no longer analyzed. In some examples, an ongoing call that was originally determined to be non-fraudulent is revisited at a later time to determine if the call has the potential to become fraudulent.

The length of time and the degree to which a call is analyzed is in some cases determined based on a balance of cost and quality. In an example, the length of time and the degree to which a call is analyzed is optimized to provide the maximum possible quality for a given cost.

As discussed, an interface such as an API is in various cases provided that enables access to entities such as a financial institution. The interface in some cases provides real time notifications of a fraud risk for a given call. When a request is sent to a financial institution to perform a transaction by one of their customers, the financial institution queries the API, which indicates that the customer is currently on a call and provides the risk that the call is fraudulent. The financial institution is enabled to then determine whether to enable the requested transaction based on the information.

The determination in such cases in various examples includes the type of information that is being discussed such as a PIN number being requested. Providing such a real time interface provides timely information to enable the institution to intervene before such crucial information is provided, which is often difficult or impossible to reverse once transacted.

The notification to the caller in some cases includes out of band notifications such as sending an SMS or alerting the carrier network so that the carrier is enabled to perform an action such as placing a notification phone call to the caller or a third party which is useful for some types of users who are vulnerable.

The notifications in some cases include the reasoning for the notification which provides additional useful information to determine an appropriate course of action. The information is in various cases provided in real time, which is useful during multifactor authentication where information about an ongoing call is enabled to be used to determine if an SMS or other message providing codes or other information should be sent to authenticate a user.

Responsive actions in response to a classification in various examples include any of: sending a message to a user associated with the call, the message indicating the classification of the call received in the response, recommending a remedial action to lower a risk associated with the classification of the call received in the response, performing a remedial action to lower a risk associated with the classification of the call received in the response, sending a message to a user associated with the call, terminating the call, and interjecting an audio message into the call.

Figure 1B:
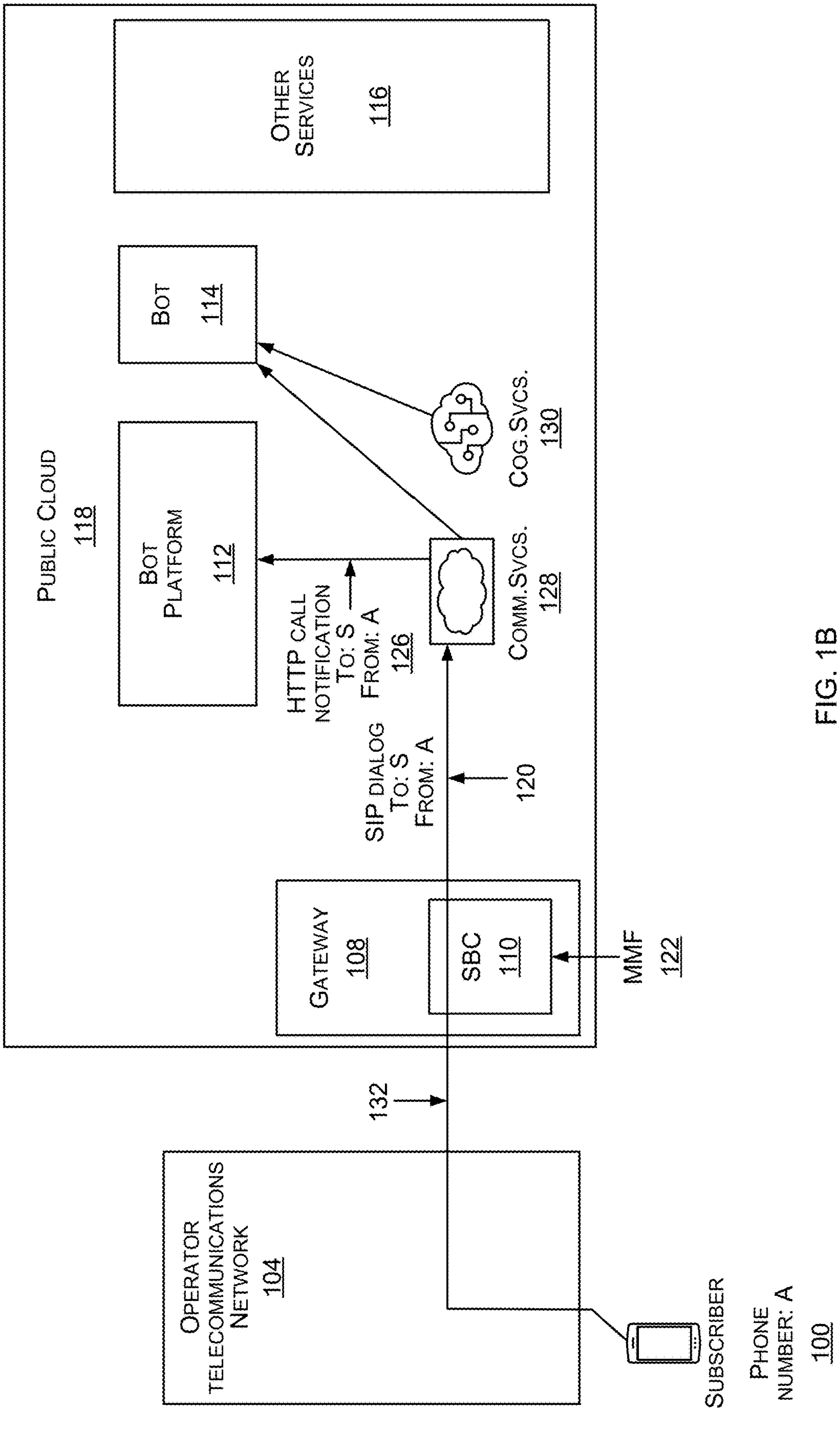
FIG. 1B illustrates a second exemplary architecture implementing the disclosed technology.

FIG. 1B illustrates a second exemplary architecture implementing the disclosed technology. Instead of sending a SIPREC session to the communications services 128 as in FIG. 1A, in FIG. 1B the operator assigns an IP Multimedia Subsystem (IMS) Public Service Identity (PSI) as the 'service number' to dial, and routes calls to the service number to the SBC 110, which forwards these calls to the communications services 128, which receive a call alongside the original caller number and the destination callee number set to the PSI ('S' in the diagram). Here, a call is provided through a provider of public cloud 118. Bot 114 represents a media-streaming bot in FIG. 1B, as will elaborated upon below.

Figure 1C:
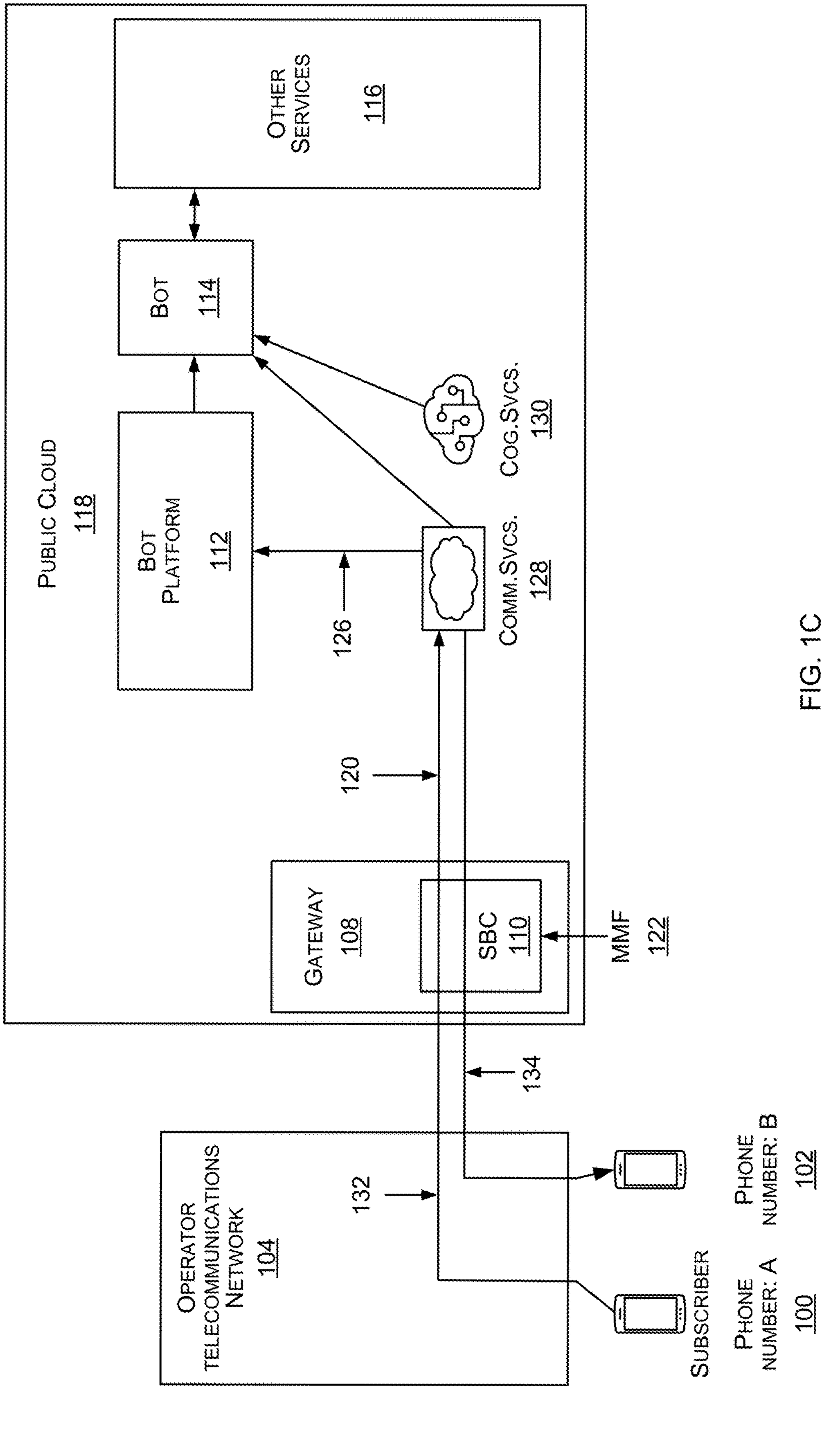
FIG. 1C illustrates a third exemplary architecture implementing the disclosed technology.

FIG. 1C illustrates a third exemplary architecture implementing the disclosed technology. The operator routes applicable calls 132 to the SBC 110, as applicable to each of the examples herein on an adjacency, which in various examples is dedicated. The SBC 110 runs a MMF 122 which encodes the caller and callee numbers, session case and desired voice AI service (for example to be used to convert the call to text), in SIP signaling within a UUI header, which comprises instruction to invoke the bot 114. The call is then forwarded 120. The communication services 128 receives the UUI header and notifies 126 the bot platform 112. The platform 112 then dials out 134 to the original target 102. Bot 114 represents a media-streaming bot or a text bot, as will be elaborated upon below.

Figure 1D:
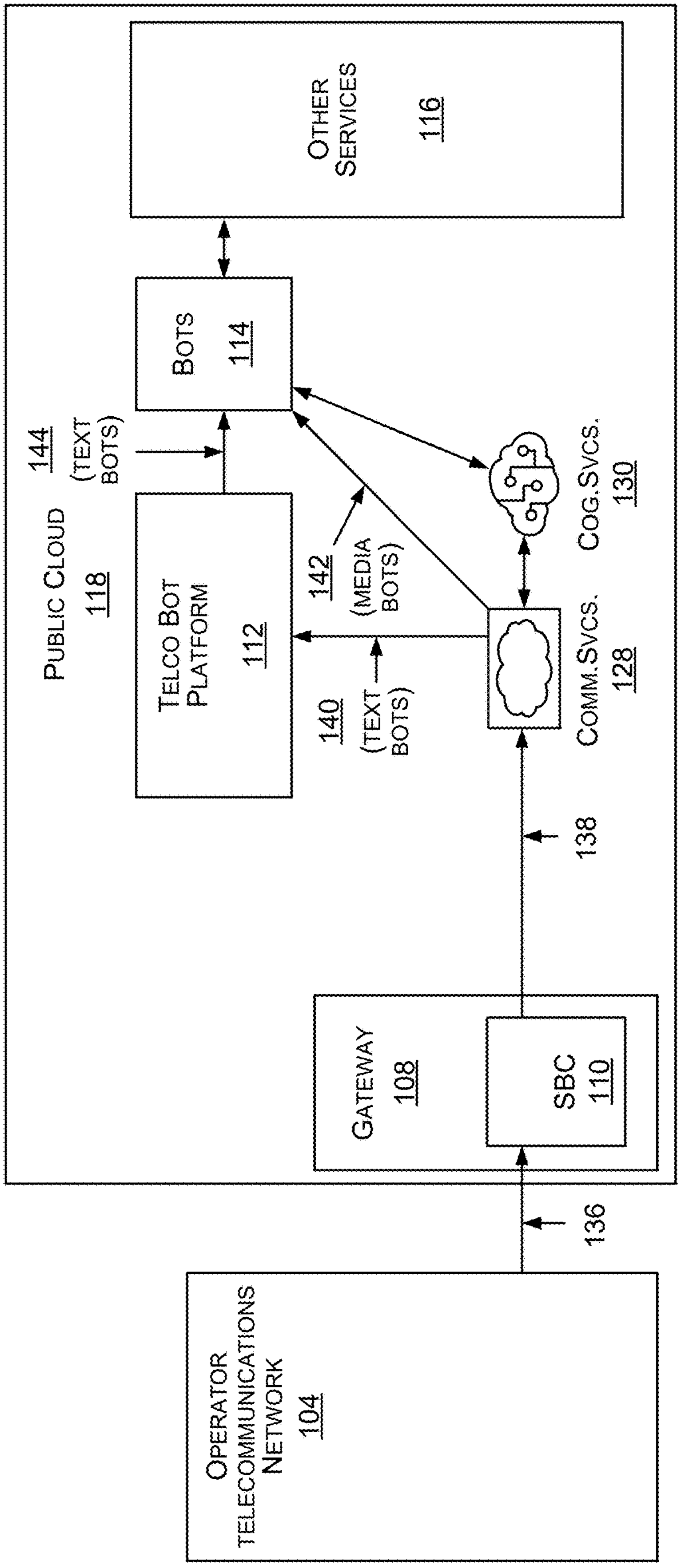
FIG. 1D illustrates a fourth exemplary architecture implementing the disclosed technology.

FIG. 1D illustrates a fourth exemplary architecture implementing the disclosed technology. The route 136-110-138-128 corresponds to call routing according to the above-mentioned techniques. In various examples, text bots are implemented. For text bots, the communications services 128 perform speech-to-text on the received call 138 and deliver 140, 144 text to the bots 114, which in an example is coordinated by the platform 112. Cognitive services 130 are used to perform such speech-to-text processing.

In various examples, media-streaming bots are additionally or alternatively implemented. Communications services 128 stream media 142 directly to a bot 114, and the bot relays the stream to other services. This enables bots to perform functions other than performing speech-to-text on the call, and streaming media to cognitive services 130 speech-to-text API's in some cases provides lower latencies. Thus, the architecture supports media streaming and direct interfacing to cognitive services to perform speech-to-text, and deliver the same text interface to text bots. The bots 114 are in some cases text bots receiving text from the platform 112 or media-streaming bots which receive media from communications services 128. The bots in various examples perform analysis of the media stream. Example applications include using AI emotion detection on the call audio to provide a further data-point that contributes to the fraud analysis; or using an AI deepfake detection process to identify deepfake audio, and thereby contribute to the fraud analysis decision.

While the described illustrations are provided in the context of fraud detection, the disclosed technology is implementable to detect various different kinds and content of voice calls. For example, the disclosed technology is implementable to perform real time conversational large language model analysis of a call and enable real time response for the following:

- Enterprise spear phishing detection
- Child monitor (bullying/grooming/gang/drugs etc.)
- In-call assistant, for example:
  - Summarize the call thus far for someone newly joining a 3-way call or meeting
  - Answer simple web search type questions, such as "remind me, what was Microsoft's annual revenue in 2010"
  - Automatic receptionist
- In-call coach, for example:

Negotiation coach (e.g. insurance, mobile phone contract)

Skilled worker coach (e.g. sales, legal, financial, medical)

Sentiment analysis coach

Pro-active outbounds calling, for example:

Vulnerable person check-in

Dating check-in

Real time call transcription for later conversational LLM AI processing, for example:

Call summarization

Call note taker, for example to store call text in database and allow later query through web or voice GUI noting "summarize the calls I had today" or "what was the address Matt gave me on the call this afternoon?"

PA/scheduler

Figure 2:
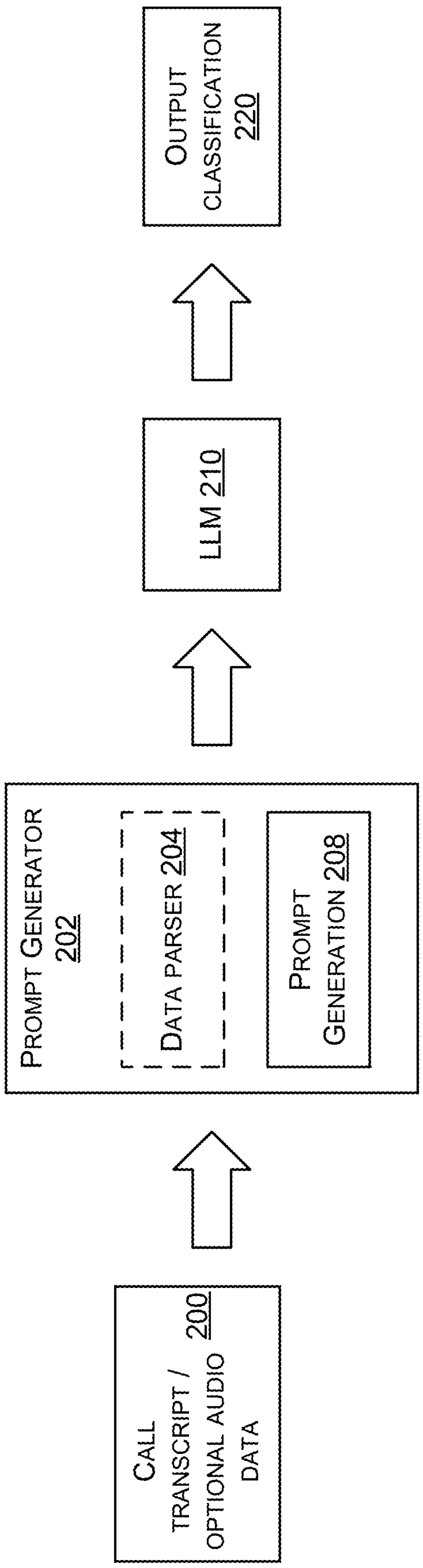
FIG. 2 is a flow diagram of a general method for classifying a call according to the disclosed technology.

Call translation services, for example to translate a call from one language to another FIG. 2 is a flow diagram of a general method for classifying a call according to the disclosed technology. Such a method is in various examples implemented by a bot 114 of FIGS. 1A-1D.

A transcript of the call is accessed and input 200, the transcript in various examples generated from a sample of the call in progress, into a prompt generator 202. Alternatively, input data 200 comprises audio data associated with the call, and prompt generator 202 optionally converts audio data into text data using a text-to-speech model. Prompt generator 202 in various examples otherwise parses the input data 200 using a data parser 204, and subsequently generates a prompt 208 directed to LLM 210. The prompt instructs the LLM 210 to classify the call represented by the transcript. In various examples, the classification is one of at least one provided classifications in the prompt, and in some cases is a continuous (for example a risk score) or categoric (for example classification as risky or not) classification. The LLM 210 is prompted, for example by sending the prompt to the LLM 210 as input, and the LLM 210 produces an output classification 220 in response to the prompt.

In various examples, the LLM 210 is run locally on a client device which also comprises the prompt generator 202. In other examples, the LLM 210 is run on a server of a network and is prompted via the network, in various examples using an API.

Figure 3:
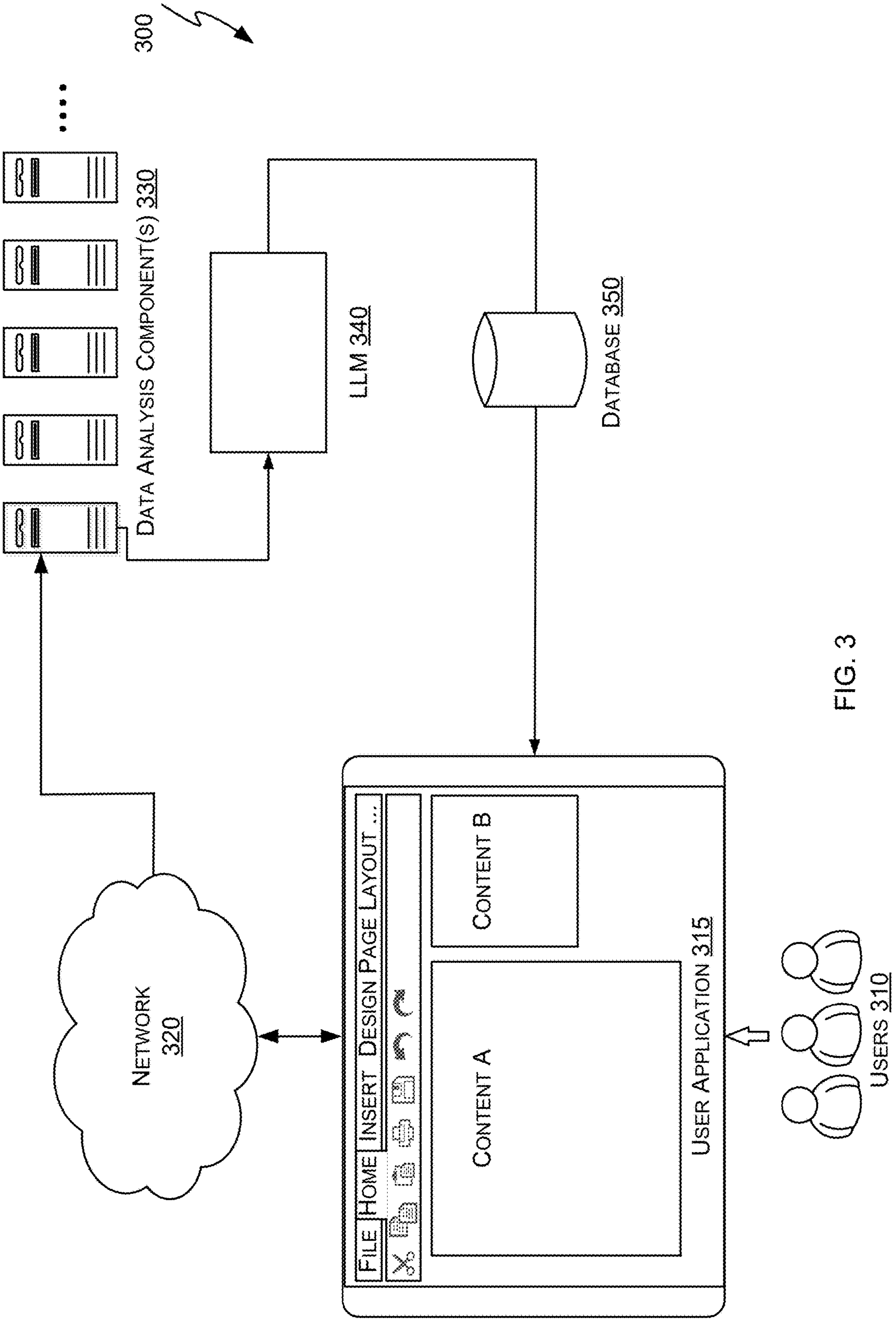
FIG. 3 is a schematic diagram of an exemplary system implementing the disclosed technology.

FIG. 3 is a schematic diagram of an exemplary system 300 implementing the disclosed technology. An LLM 340 is configured to perform analysis and identification, prediction or other functions based on data collected and processed by data analysis components 330 (which are in an example a data analysis component 330). The data analysis components 330 in various examples comprise physical computing devices such as server computers or other types of hosts, associated hardware components (for example memory and mass storage devices), and networking components (for example routers, switches and cables). The data analysis components 330 also include, for example, software, such as operating systems, applications, and containers, network services, virtual components, such as virtual disks, virtual networks, and virtual machines.

In accordance with the disclosed technology, a data analysis component prompts large-language model 340 to classify a call represented by a transcript. In various examples, the transcript and/or prompt is received via one or more of: a network 320, user application 315 (such as from input from a user 310), and a data analysis component 330 (such as another data analysis component to the component prompting the model 340, from data previously received and stored by the data analysis component 330, or from data accessed by the data analysis component 330).

Database 350 includes, for example data, such as a database, or a database shard (i.e., a partition of a database), and stores classifications and other outputs produced by the large-language model 340. Feedback in various cases is used to further update various parameters that are used by large-language model 340. Data is in some cases provided to the user application 315 to provide results to various users 310 using a user application 315, or used to take an action in response to the classification produced by the model 340. In some configurations, large-language model 340 is configured to utilize supervised and/or unsupervised machine learning technologies. In various examples, data analysis components 330 receive a response to a prompt from the model 340 comprising a classification of the call, and data analysis components 330 initiate an action in response to the classification at a telecommunications network with which the call is associated. Data analysis components 330 are therefore in various examples connected to the telecommunications network.

In various examples, model 340 is located on a cloud server, and is prompted by a data analysis component 330 via a network, such as by using an API. In other examples, model 340 is located on a data analysis component 330, in various examples the data analysis component 330 which constructs the prompt instructing the model 340 to classify a call.

Figure 4:
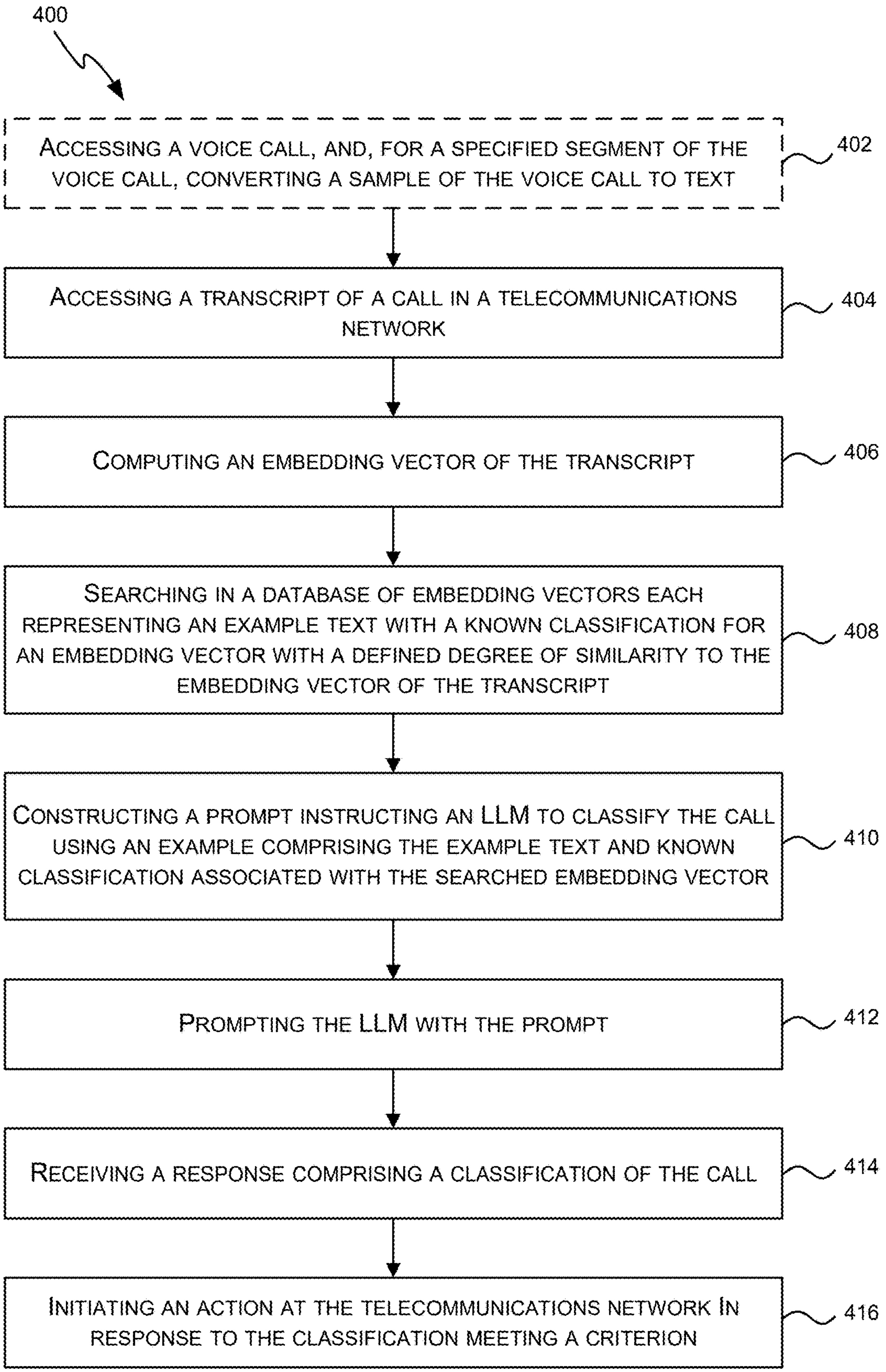
FIG. 4 is a flow diagram of a method for classifying a call using a prompt and an example according to the disclosed technology.

FIG. 4 is a flow diagram of a method for classifying a call represented by a transcript using a prompt and an example, in accordance with the disclosed technology. Method 400 comprises firstly accessing a transcript of a call in a telecommunications network 404. Optionally, the call is a voice call, and accessing the transcript of the call comprises accessing the voice call, and, for a specified segment of the voice call, converting a sample of the voice call to text 402. In this way, the transcript of the call is then accessible.

An embedding vector of the transcript is then computed 406. Computing an embedding vector of a text is a well-known concept, and in various examples is computed by inputting the text into an encoder machine learning model (for example a neural network encoder model) trained to compute embedding vectors. In an example the encoder is a neural network for encoding text to vectors such as Word2Vec, BERT, ROBERTA, or any other neural network which has been trained to compute contextualized embeddings from text.

The method 400 then comprises searching in a database of embedding vectors, each representing an example text with a known classification, for a first embedding vector with a defined degree of similarity to the embedding vector of the transcript 408. The database of embedding vectors is constructed by computing embedding vectors of at least one example text with a known classification in the same way that the embedding vector of the transcript 404 was computed, for example by using the same model to compute the embedding vectors. The embedding vectors searched for in the database are in the same multi-dimensional space as the embedding vectors computed by the encoder that encodes the transcript. In some cases this is done by transforming the vector embeddings computed by the encoder into the multi-dimensional space of the database using a mapping. In some cases, the embedding vectors in the database are in the same embedding space (i.e. multi-dimensional space) as the embedding vectors computed by the encoder that encodes the transcript.

It should be appreciated that the search itself is performable in various ways, for example by computing a distance metric such as a cosine similarity or other distance metric between the embedding vector of the transcript and each of the vectors in the database, or by any other method that is well-known. The defined degree of similarity between the embedding vector of the transcript and the embedding vector searched for in various examples refers to the most similar, second most similar, fifth most similar or any other most similar vector. Similarity in various examples refers to a distance metric computed using the positions of the embedding vectors in vector-space, for example a straight-line distance, though other distance metrics are well-known. In various examples, the defined degree of similarity refers to a vector within a certain distance in vector space of the embedding vector of the transcript, and for example refers to a first vector found within the certain distance, a second vector found within the certain distance, or any other characteristic defining the degree of similarity between vectors.

It should also be appreciated that the degree of similarity is in various examples defined by a user input, hardcoded into the disclosed method, determined empirically, and/or defined using a characteristic of the transcript representing the call to be classified, for example a length or any other characteristic. A shorter length of transcript in some cases is used to reduce a degree of similarity defined for the search (i.e. to search for examples with embedding vectors that are less similar than before the degree of similarity was reduced).

In some cases, in response to no vectors in the database being found within a defined degree of similarity, a most similar vector in the database is searched for and obtained.

Once an embedding vector with the defined degree of similarity to the embedding vector of the transcript is searched for and obtained, the method 400 comprises constructing a prompt 410, the prompt comprising an instruction directed to a large-language model and instructing the model to classify the call represented by the transcript using a first example. The prompt further comprises the transcript to be classified and the first example, the first example being an example text represented by the first embedding vector alongside the known classification associated with that example text. In various examples, the prompt comprises only examples associated with embedding vectors with the defined degree of similarity, i.e. the prompt does not comprise examples associated with embedding vectors that do not have the defined degree of similarity (such as being more dissimilar than the defined degree of similarity and/or not having the defined degree of similarity).

In various examples, the example texts and associated known classifications of the embedding vectors in the database that is searched are located also in a database, for example the same database as the embedding vectors. In this case, the method 400 optionally comprises searching for and obtaining the example text and associated known classification using the searched for embedding vector.

The LLM is then prompted 412, and a response comprising a classification of the call received 414.

In various examples, the LLM is trained in accordance with well-known training methods to respond to general natural language prompts. For example, the LLM is a conversational LLM, and/or a generative pre-trained transformer model such as OpenAI's ChatGPT.

In response to the received classification meeting a criterion, in various examples criteria, method 400 further comprises initiating an action at the telecommunications network 416. The criterion and/or criteria in various examples is a defined criterion including or being any of a fraud level, a specific defined classification, a defined range of labels or any other criteria. Meeting, in this context, refers to being equivalent to or falling within the defined criterion/criteria. Such an action for example includes at least one of: sending a message to a user associated with the classified call, terminating the call, and interjecting an audio message into the call. Additionally or alternatively, such an action includes recommending a remedial action to lower a risk associated with the classification of the call, and/or performing a remedial action to lower a risk associated with the classification of the call. A risk associated with the classification of the call is an, optionally defined, issue, for example a callee (for example a user of the telecommunications network) losing access to their account or a security breach of the telecommunications network, when the call is classified as fraudulent or meets another criterion. A remedial action in this case is an action to counter the issue, for example terminating the call to reduce the risk of the user losing access to their accounts, or reducing user privileges of the callee to reduce the risk of a fraudulent caller accessing resources of the telecommunications network using user credentials. Such a remedial action is in some cases recommended, such as by displaying a text recommending the action on a display, sending a message to a user, or interjecting a voice message recommending an action. It should be appreciated that any remedial action and any risk that is associated with the classification of the call is in various examples used, and that the abovementioned cases are merely exemplary. In various examples, the LLM is prompted to recommend or otherwise initiate the action in response to a determined classification of the call.

Figure 5:
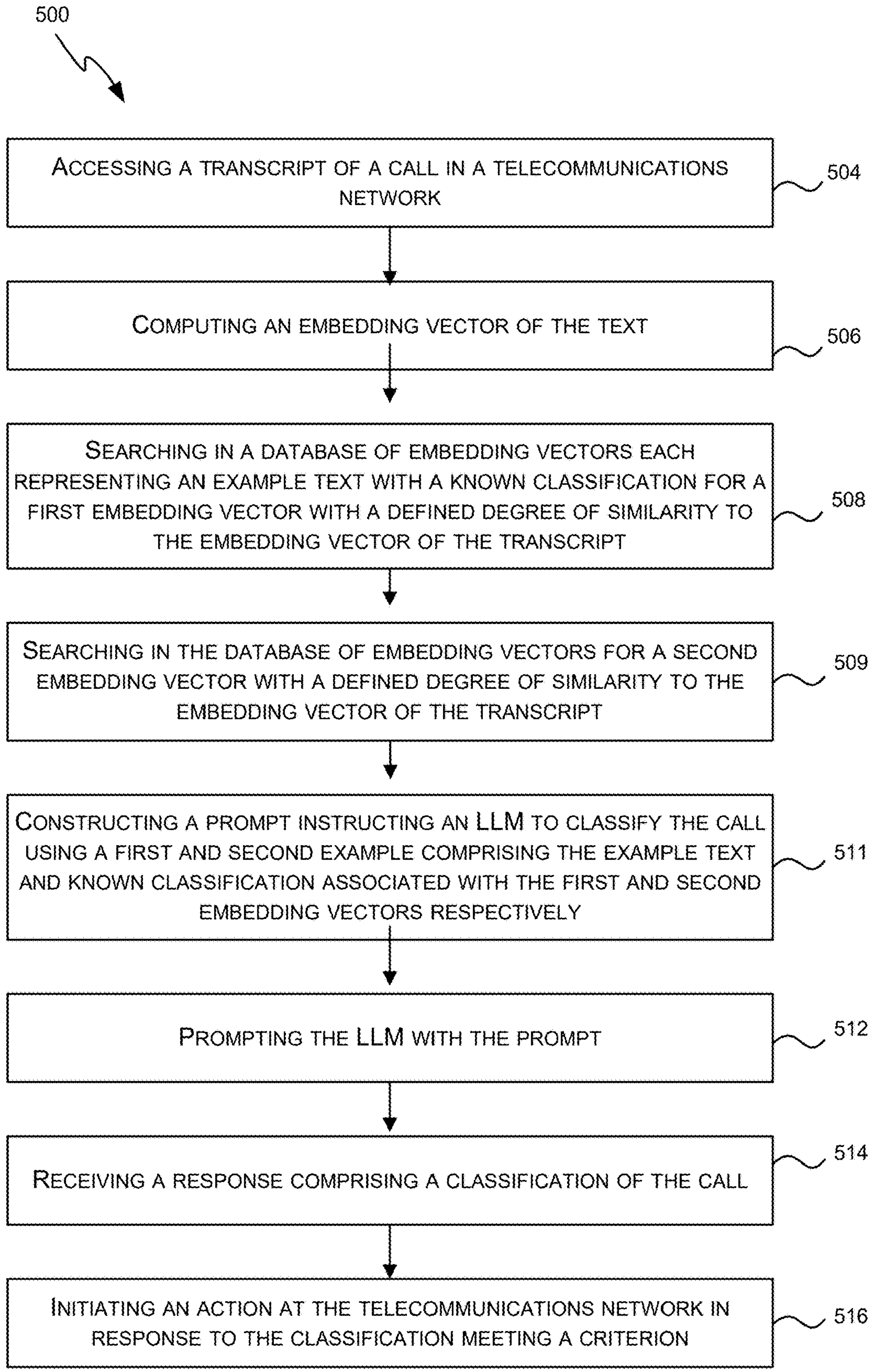
FIG. 5 is a flow diagram of a method for classifying a call using a prompt and multiple examples according to the disclosed technology.

FIG. 5 is a flow diagram of a method for classifying a call in a telecommunications network using a prompt and multiple examples according to the disclosed technology. Method 500 is an extension to method 400, comprising similar blocks including accessing a transcript of the call 504 and computing an embedding vector of the transcript 506. Additionally, method 500 comprises searching in a database of embedding vectors for a first embedding vector with a defined degree of similarity to the embedding vector of the text 508 in the same way as the searching 408 in method 400. Method 500, in extension to method 400, further comprises searching in the database of embedding vectors for a second embedding vector with a defined degree of similarity to the embedding vector of the transcript 509. The defined degree of similarity with respect to the second embedding vector for example is the same degree of similarity as with respect to the first embedding vector (such as within a defined distance in vector space where there are multiple vectors in the database within such a distance) or a different degree of similarity as with respect to the first embedding vector (such as a second closest vector in vector space where the first vector was a closest vector, a third, fourth, tenth or any other closest vector, or a different defined distance metric in vector space). Here, vector space refers to the vector space of the vectors in the database of embedding vectors and therefore the vector space of the embedding vector of the transcript representing the call to be classified, given that the same method for computing the embedding vector of the transcript is used as the method for computing the embedding vectors in the database from the text examples, should this approach to constructing the database be followed.

Given the two embedding vectors that are searched for, a prompt is then constructed 511 in the same way as described with respect to method 400 but, in extension to method 400, the prompt comprises two examples: an example text and associated known classification represented by the first embedding vector, and an example text and associated known classification represented by the second embedding vector.

In various examples, the prompt comprises only examples represented by embedding vectors within and/or meeting the defined degree of similarity with the embedding vector of the transcript representing the call to be classified, i.e. the prompt does not comprise examples represented by embedding vectors that are more dissimilar and/or do not meet the defined degree of similarity.

In one example, the second embedding vector is a second closest embedding vector to the embedding vector of the transcript, and in another example, in response to the second closest embedding vector being an embedding vector with an associated example that has an equivalent same characteristic as an example represented by the first embedding vector, the second embedding vector is searched for as a closest embedding vector to the embedding vector of the transcript that represents an example with a different same characteristic (i.e. a different value associated with the same characteristic). Such a same characteristic for example includes an associated known classification, a context (i.e. transcript representing a bank compared to a delivery company call), or a user gender or emotion of a user whose speech is represented in the example text. Many other characteristics are in various examples used.

It should be appreciated that, although the disclosed technology is illustrated with respect to one and two examples in a prompt, any number of examples are in various cases included and their representative embedding vectors searched for using various degrees of similarity; for example, every example represented by an embedding vector that is more similar to the embedding vector of the transcript than a defined degree of similarity is in some examples included in the prompt. Additionally or alternatively, a number of examples in the prompt is limited to a defined number.

In any event, the disclosed technology enables the prompting of the large-language model with less examples than if all examples (or even examples associated with different known classifications to those applicable to the call to be classified) were included in a static prompt, whilst maintaining accuracy, especially when examples represented by more similar embedding vectors are included in the prompt over examples represented by less similar embedding vectors to the embedding vector of the transcript.

Once the prompt is constructed 511, the LLM is prompted 512 with the constructed prompt, and a response is received comprising a classification of the call 514. As with method 400, method 500 comprises initiating an action 516 at the telecommunications network in response to the classification received 514 in the response to the prompt 512 meeting a criterion, in various examples criteria. In the disclosed methods herein, initiating an action at the telecommunications network is performed in response to the classification, optionally not only when the classification meets a criterion or criteria. Method 500 in various examples comprises same actions after classifying the text or otherwise interspersed in time with the blocks of method 500, as method 400.

Figure 6:
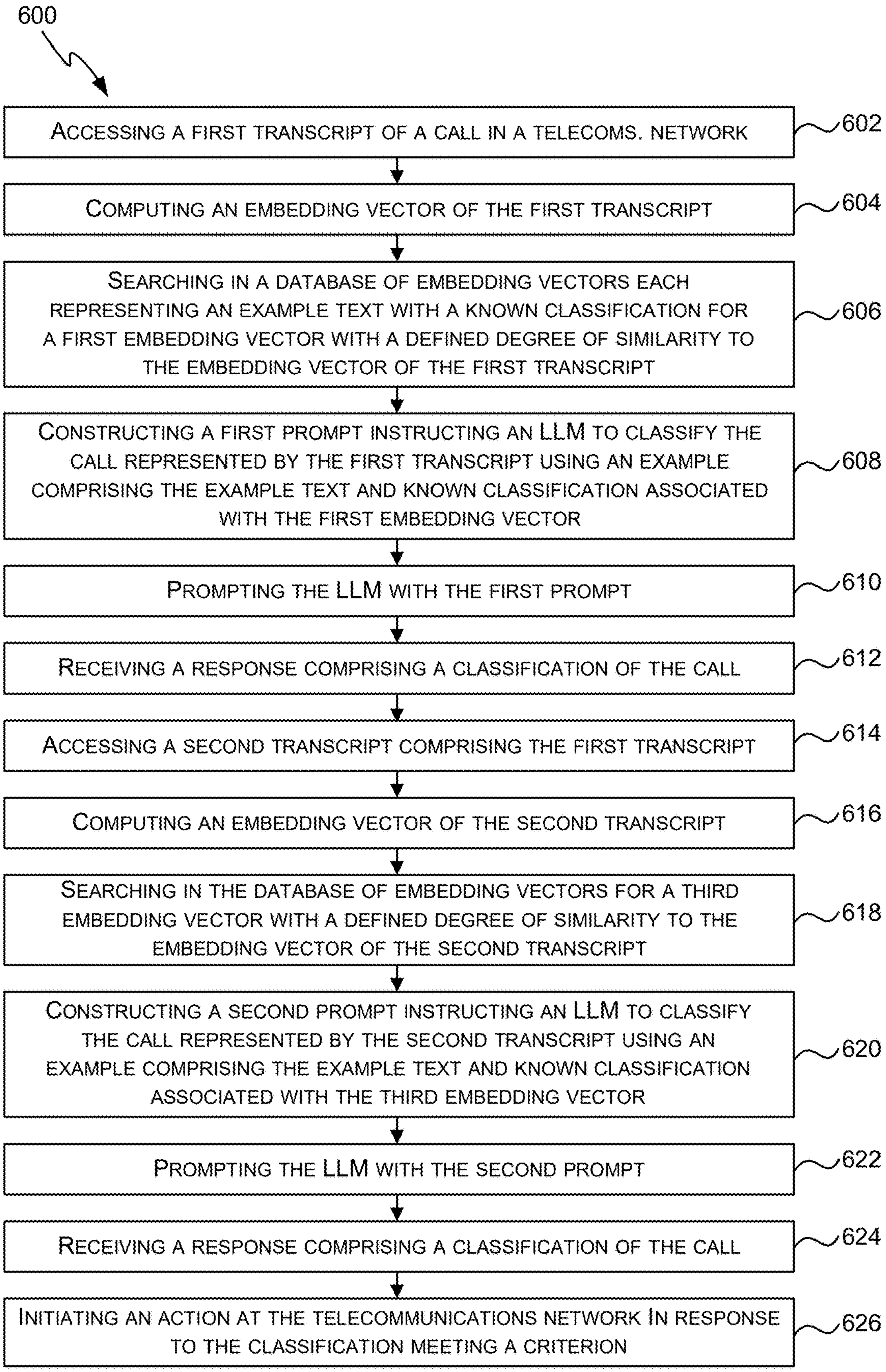
FIG. 6 is a flow diagram of a method for classifying a call represented by a first transcript and a second transcript comprising the first transcript according to the disclosed technology.

FIG. 6 is a flow diagram of a method for classifying a call in a telecommunications network using a first transcript and a second transcript comprising the first transcript according to the disclosed technology. Method 600 is an extension to methods 400 and/or 500, in that its blocks are in various examples interspersed in time or otherwise positioned with respect to the blocks of methods 400 and/or 500. The techniques illustrated by method 600, namely the use of two prompts, in various examples are implemented in combination with the techniques illustrated with respect to method 500, namely the use of two or more examples per prompt, in the first, second or any other prompt of method 600.

Method 600 first comprises accessing a first transcript 602, and computing an embedding vector of the first transcript 604 in accordance with the techniques described herein with respect to embedding vectors of methods 400 and 500.

Method 600 then comprises constructing a first prompt instructing the LLM to classify the call represented by the first transcript using an example 608 in accordance with construction of a prompt in method 400. Method 600 further comprises prompting the LLM with the first prompt 610 and receiving a response comprising a classification of the call 612, in accordance with method 400.

Additionally, in extension to method 400, method 600 comprises accessing a second transcript of the call in the telecommunications network to be classified, the second transcript comprising the first transcript 614. Following the method 400 but using the second transcript now as the transcript representing the call to be classified, method 600 comprises computing an embedding vector of the second transcript 616, searching in the database of embedding vectors for a third embedding vector with a defined degree of similarity to the embedding vector of the second transcript 618, and constructing a second prompt 620 instructing an LLM to classify the call represented by the second transcript using an example comprising the example text and known classification associated with the third embedding vector. The second prompt comprises the instruction instructing the LLM, the second transcript, and the example comprising the example text associated with the third embedding vector. In various examples, the defined degree of similarity is different or the same to the defined degree of similarity to the first transcript, used in the search for the first embedding vector.

Method 600 further comprises prompting the LLM with the second prompt 622 and receiving a response comprising a classification of the call 624.

Though the blocks 614-624 are illustrated in method 600 after block 612, it should be appreciated that in various examples the blocks 614-624 are interspersed or otherwise positioned among the blocks 602-612.

Method 600 comprises initiating an action at the telecommunications network in response to the classification received in the response to the second prompt meeting a criterion 626. The block 626 in various examples is performed after any of: after receiving the response to the first prompt, after receiving the response to the second prompt, prior to receiving the response to the second prompt, where prior refers to immediately prior and/or any position before. Additionally, in various examples, the classification referred to in block 626 is the classification of the call received in the response to the first and/or second prompt. In some cases, an action is initiated at the telecommunications network in response to the classification received in the response to the second prompt meeting a criterion, and an action is not initiated at the telecommunications network in response to the classification received in the response to the first prompt meeting a criterion.

It should be appreciated that, though method 600 illustrates two prompts, the technique in various examples is expanded to three, four, ten, or any other number of prompts.

In an example the second transcript is a transcript at a later time in the call to be classified than the first transcript, and the classification of the call received in the response to the second prompt is an updated classification relative to the classification of the call received in the response to the first prompt. In various examples, transcripts of a same call are accessed at certain periods, as mentioned herein with respect to FIGS. 1A-1D, such as at every nth utterance of the call, and the classification of the call is then determined in accordance with the disclosed technology.

In this way, a classification of the call is enabled in substantially real-time, and, more generally, classification is based on a more complete set of information than if the classification was not updated over the course of the call using an updated transcript, i.e. a second transcript comprising the first transcript. As mentioned herein, a transcript at a later time in a call refers to a transcript representing language in the call at later times than a transcript at an earlier time in the call, which refers to a transcript representing language in the call at earlier times and not language at the later times. FIGS. 1A-1D illustrate how an in-progress call is accessed and a transcript produced and/or accessed in accordance with the disclosed technology, in various examples.

Figure 7:
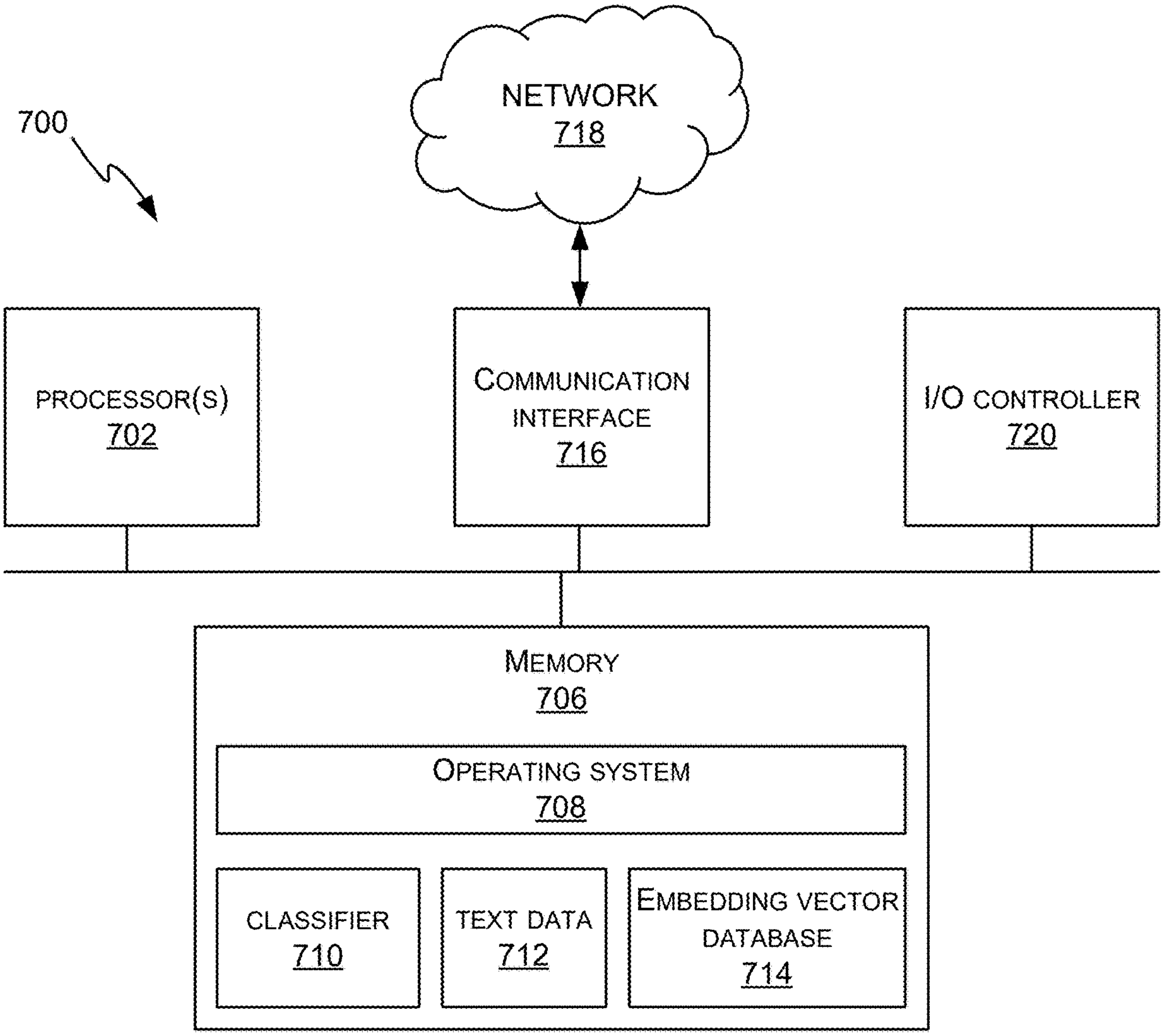
FIG. 7 illustrates an exemplary computing-based device in which examples of the disclosed classification methods are implemented.

FIG. 7 illustrates various components of an exemplary computing-based device 700 which are implemented as any form of a computing and/or electronic device, and in which examples of a classifier 710 are implemented in some cases. In some cases the computing based device 700 is a node of a telecommunications network.

Computing-based device 700 comprises one or more processors 702 which are microprocessors, controllers or any other suitable type of processors for processing computer executable instructions to control the operation of the device in order to construct a prompt and classify a call. In some examples, for example where a system on a chip architecture is used, the processors 702 include one or more fixed function blocks (also referred to as accelerators) which implement a part of the method of FIGS. 4-6 in hardware (rather than software or firmware).

Platform software comprising an operating system 708 or any other suitable platform software is provided at the computing-based device to enable application software to be executed on the device.

The computer executable instructions are provided using any computer-readable media that is accessible by computing based device 700. Computer-readable media includes, for example, computer storage media such as memory 706 and communications media. Computer storage media, such as memory 706, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 706) is shown within the computing-based device 700 it will be appreciated that the storage is, in some examples, distributed or located remotely and accessed via a network or other communication link (e.g. using communication interface 716). In various examples, communication interface 716 is used to communicate via network 718, such as to communicate with a large-language model in order to prompt the model and receive responses, or to initiate an action at a telecommunications network.

Memory 706 further comprises a classifier 710 which performs aspects of the disclosed technology, optionally text data 712 comprising a transcript used for classification, and optionally an embedding vector database 714 storing embedding vectors representing example texts and their associated known classifications, and additionally, in various examples, storing the example texts and/or their associated classifications.

The computing-based device 700 also optionally comprises an input/output controller 720 arranged to output display information to a display device which is in various cases separate from or integral to the computing-based device 700. The display information provides, in some cases, a graphical user interface. The input/output controller 720 is also arranged to receive and process input from one or more devices, such as a user input device (e.g. a mouse, keyboard, camera, microphone or other sensor). This user input in some cases is used to provide input to the disclosed methods herein, such as to define variables and thresholds. In an example the display device also acts as the user input device if it is a touch sensitive display device. The input/output controller 720 outputs data to devices other than the display device in some examples, such as entities for initiating an action in response to a determined classification.

Alternatively or in addition to the other examples described herein, examples include any combination of the following:

Clause A. An apparatus comprising:
- a processor;
- a memory storing instructions that, when executed by the processor, perform a method for classifying a call in a telecommunications network, comprising:
  - accessing a transcript of the call;
  - computing an embedding vector of the transcript;
  - searching in a database of embedding vectors, each embedding vector representing an example text associated with a known classification, for a first embedding vector with a defined degree of similarity to the embedding vector of the transcript;
  - constructing a first prompt, the first prompt comprising:
    - an instruction directed to a large-language model, the instruction instructing the large-language model to classify the call represented by the transcript using a first example;
    - the transcript;
    - the first example, the first example being:
      - an example text represented by the first embedding vector; and
      - the known classification associated with the example text represented by the first embedding vector;
  - prompting the large-language model with the first prompt;

receiving a response to the first prompt from the large-language model, the response comprising a classification of the call; and in response to the classification meeting a criterion, initiating an action at the telecommunications network.

Clause B. The apparatus of Clause A, wherein the call is a voice call that is in progress in the telecommunications network, and wherein accessing the transcript of the call comprises accessing the voice call and, for a specified segment of the voice call, converting a sample of the voice call to text.

Clause C. The apparatus of Clause B, wherein accessing the voice call comprises accessing only media flow of the voice call.

Clause D. The apparatus of any preceding Clause, wherein the classification is one of: whether the call is fraudulent or not, and a probability of the call being fraudulent.

Clause E. The apparatus of any preceding Clause, wherein the action at the telecommunications network comprises at least one of:

recommending a remedial action to lower a risk associated with the classification of the call, performing a remedial action to lower a risk associated with the classification of the call, sending a message to a user associated with the call, terminating the call, and interjecting an audio message into the call.

Clause F. The apparatus of any preceding Clause, wherein the large-language model is a generative pre-trained transformer model.

Clause G. The apparatus of any preceding Clause, wherein the embedding vector of the transcript is computed using a neural network encoder, and wherein the embedding vector of the transcript is in an embedding space that is the same embedding space as the first embedding vector.

Clause H. The apparatus of any preceding Clause, the method further comprising:

searching in the database of embedding vectors for a second embedding vector with a defined degree of similarity to the embedding vector of the transcript, wherein the instruction of the first prompt is an instruction instructing the large-language model to classify the call represented by the transcript further using a second example, and wherein the first prompt further comprises the second example, the second example being a second example text represented by the second embedding vector and the known classification associated with the second example text represented by the second embedding vector.

Clause I. The apparatus of Clause H, wherein the first embedding vector is a closest embedding vector, in a vector-space of vectors in the database of embedding vectors, to the embedding vector of the transcript, and the second embedding vector is one of:

a second-closest embedding vector, in a vector-space of vectors in the database of embedding vectors, to the embedding vector of the transcript, and in response to the second-closest embedding vector representing an example associated with a same classification as a classification associated with an example represented by the first embedding vector, a closest embedding vector, in the vector-space of vectors in the database of embedding vectors to the embedding vector of the transcript, representing an example associated with a different classification to the classification associated with the example represented by the first embedding vector.

Clause J. The apparatus of any preceding Clause, wherein the transcript is a first transcript, wherein the classification of the call is a first classification and wherein the method further comprises:

accessing a second transcript comprising the first transcript;

computing an embedding vector of the second transcript;

searching in the database of embedding vectors for a third embedding vector which is close to the embedding vector of the second transcript;

constructing a second prompt, the second prompt comprising:

an instruction directed to the large-language model, the instruction instructing the large-language model to classify the call represented by the second transcript using a third example;

the second transcript;

the third example, the third example being:

an example text represented by the third embedding vector; and the known classification associated with the example text represented by the third embedding vector;

subsequent to prompting the large-language model with the first prompt, prompting the large-language model with the second prompt;

receiving a response to the second prompt from the large-language model, the response comprising a second classification of the call; and in response to the second classification meeting a criterion, initiating an action at the telecommunications network.

Clause K. The apparatus of Clause J wherein the second transcript is a transcript at a later time than the first transcript in the same call, and wherein the second classification is an updated classification of the call relative to the first classification.

Clause L. A computer-implemented method for classifying a fraud level of a voice call that is in progress in a telecommunications network, comprising:

accessing the voice call;

for a specified segment of the voice call, converting a sample of the voice call to text, the text comprising a transcript of at least a portion of the voice call;

computing an embedding vector of the transcript;

searching in a database of embedding vectors, each embedding vector representing an example text associated with a known classification of a fraud level of the example text, for a first embedding vector with a defined degree of similarity to the embedding vector of the transcript;

constructing a first prompt, the first prompt comprising:

an instruction directed to a conversational large-language model, the instruction instructing the conversational large-language model to classify a fraud level of the call represented by the transcript using a first example;

the transcript;

the first example, the first example being:

an example text represented by the first embedding vector; and the known classification associated with the example text represented by the first embedding vector;

prompting the conversational large-language model with the first prompt;

receiving a response to the first prompt from the conversational large-language model, the response comprising a classification of a fraud level of the call; and in response to the classification of the fraud level of the call indicating that the call is fraudulent above a defined level, initiating an action at the telecommunications network, the action comprising at least one of: sending a message to a user associated with the call, terminating the call, and interjecting an audio message into the call.

Clause M. A computer-implemented method for classifying a call in a telecommunications network, comprising:

accessing a transcript of the call;

computing an embedding vector of the transcript;

searching in a database of embedding vectors, each embedding vector representing an example text associated with a known classification, for a first embedding vector with a defined degree of similarity to the embedding vector of the transcript;

constructing a first prompt, the first prompt comprising:

an instruction directed to a large-language model, the instruction instructing the large-language model to classify the call represented by the transcript using a first example;

the transcript;

the first example, the first example being:

an example text represented by the first embedding vector; and the known classification associated with the example text represented by the first embedding vector;

prompting the large-language model with the first prompt;

receiving a response to the first prompt from the large-language model, the response comprising a classification of the call; and in response to the classification meeting a criterion, initiating an action at the telecommunications network.

Clause N. The method of Clause M, wherein the call is a voice call that is in progress in the telecommunications network, and wherein accessing the transcript of the call comprises accessing the voice call and, for a specified segment of the voice call, converting a sample of the voice call to text.

Clause O. The method of Clause N, wherein accessing the voice call comprises accessing only media flow of the voice call.

Clause P. The method of any of Clauses M to O inclusive, wherein the classification is one of: whether the call is fraudulent or not, and a probability of the call being fraudulent.

Clause Q. The method of any of Clauses M to P inclusive, wherein the action at the telecommunications network comprises at least one of:

recommending a remedial action to lower a risk associated with the classification of the call, performing a remedial action to lower a risk associated with the classification of the call, sending a message to a user associated with the call, terminating the call, and interjecting an audio message into the call.

Clause R. The method of any of Clauses M to Q inclusive, wherein the large-language model is a generative pre-trained transformer model.

Clause S. The method of any of Clauses M to R inclusive, wherein the embedding vector of the transcript is computed using a neural network encoder, and wherein the embedding vector of the transcript is in an embedding space that is the same embedding space as the first embedding vector.

Clause T. The method of any of Clauses M to S inclusive, further comprising:

searching in the database of embedding vectors for a second embedding vector with a defined degree of similarity to the embedding vector of the transcript, wherein the instruction of the first prompt is an instruction instructing the large-language model to classify the call represented by the transcript further using a second example, and wherein the first prompt further comprises the second example, the second example being a second example text represented by the second embedding vector and the known classification associated with the second example text represented by the second embedding vector.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations are in various cases carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer in some cases downloads pieces of the software as needed, or executes some software instructions at the local terminal and some at the remote computer (or computer network). Those skilled in the art will also realize that by utilizing conventional techniques known to those skilled in the art that all, or a portion of the software instructions are in various cases carried out by a dedicated circuit, such as a digital signal processor (DSP), programmable logic array, or the like.

Any range or device value given herein is in various cases extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above in some cases relate to one embodiment or in other cases relate to several embodiments. The embodiments are not limited to those that solve any or all of the stated problems or those that have any or all of the stated benefits and advantages. It will further be understood that reference to 'an' item refers to one or more of those items.

The operations of the methods described herein in some cases are carried out in any suitable order, or simultaneously where appropriate. Additionally, individual blocks are in various cases deleted from any of the methods without departing from the scope of the subject matter described herein. Aspects of any of the examples described above are combinable with aspects of any of the other examples described to form further examples without losing the effect sought.

The term 'comprising' is used herein to mean including the method blocks or elements identified, but that such blocks or elements do not comprise an exclusive list and a method or apparatus in some cases contains additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The configurations described above enable various methods including user input to a computer system. It will be understood, however, that the methods here described, and others within the scope of this disclosure, are in some cases enabled by different configurations as well. The methods herein, which involve the use of audio transcripts from user calls, may and should be enacted with utmost respect for personal privacy. Accordingly, the methods presented herein are fully compatible with opt-in participation of the persons having their calls observed. In examples where personal data is collected on a local system and transmitted to a remote system for processing, that data is in some cases anonymized in a known manner. In other examples, personal data is confined to a local system, and only non-personal, summary data transmitted to a remote system.

What is claimed is:

1. An apparatus comprising:
a processor;
a memory storing instructions that, when executed by the processor, cause the apparatus to perform operations for classifying a call in a telecommunications network, the operations comprising:
accessing a transcript of the call;
computing an embedding vector of the transcript;
searching a database of embedding vectors for a first embedding vector with a defined degree of similarity to the embedding vector of the transcript, wherein each embedding vector represents an example text associated with a known classification;
constructing a first prompt, the first prompt comprising:
an instruction directed to a large-language model, the instruction instructing the large-language model to classify the call represented by the transcript using a first example;
the transcript;
the first example, the first example comprising:
an example text represented by the first embedding vector; and
the known classification associated with the example text represented by the first embedding vector;
prompting the large-language model with the first prompt;
receiving a response to the first prompt from the large-language model, the response comprising a classification of the call; and
in response to the classification meeting a criterion, initiating an action at the telecommunications network.

2. The apparatus of claim 1, wherein the call is a voice call that is in progress in the telecommunications network, and wherein accessing the transcript of the call comprises accessing the voice call and, for a specified segment of the voice call, converting a sample of the voice call to text.

3. The apparatus of claim 2, wherein accessing the voice call comprises accessing only media flow of the voice call.

4. The apparatus of claim 1, wherein the classification is one of: whether the call is fraudulent or not, and a probability of the call being fraudulent.

5. The apparatus of claim 1, wherein the action at the telecommunications network comprises at least one of:
recommending a remedial action to lower a risk associated with the classification of the call,
performing a remedial action to lower a risk associated with the classification of the call,
sending a message to a user associated with the call,
terminating the call, or
interjecting an audio message into the call.

6. The apparatus of claim 1, wherein the large-language model is a generative pre-trained transformer model.

7. The apparatus of claim 1, wherein the embedding vector of the transcript is computed using a neural network encoder, and wherein the embedding vector of the transcript is in an embedding space that is the same embedding space as the first embedding vector.

8. The apparatus of claim 1, further comprising instructions that, when executed by the processor, cause the apparatus to perform operations comprising:
searching in the database of embedding vectors for a second embedding vector with a defined degree of similarity to the embedding vector of the transcript,
wherein the instruction of the first prompt is an instruction instructing the large-language model to classify the call represented by the transcript further using a second example, and
wherein the first prompt further comprises the second example, the second example being a second example text represented by the second embedding vector and the known classification associated with the second example text represented by the second embedding vector.

9. The apparatus of claim 8, wherein the first embedding vector is a closest embedding vector, in a vector-space of vectors in the database of embedding vectors, to the embedding vector of the transcript, and the second embedding vector is one of:
a second-closest embedding vector, in a vector-space of vectors in the database of embedding vectors, to the embedding vector of the transcript, and
in response to the second-closest embedding vector representing an example associated with a same classification as a classification associated with an example represented by the first embedding vector, a closest embedding vector, in the vector-space of vectors in the database of embedding vectors to the embedding vector of the transcript, representing an example associated with a different classification to the classification associated with the example represented by the first embedding vector.

10. The apparatus of claim 1, wherein the transcript is a first transcript, wherein the classification of the call is a first classification; further comprising instructions that, when executed by the processor, cause the apparatus to perform operations comprising:

accessing a second transcript comprising the first transcript;

computing an embedding vector of the second transcript;

searching in the database of embedding vectors for a third embedding vector which is close to the embedding vector of the second transcript;

constructing a second prompt, the second prompt comprising:

an instruction directed to the large-language model, the instruction instructing the large-language model to classify the call represented by the second transcript using a third example;

the second transcript;

the third example, the third example being:

an example text represented by the third embedding vector; and the known classification associated with the example text represented by the third embedding vector;

subsequent to prompting the large-language model with the first prompt, prompting the large-language model with the second prompt;

receiving a response to the second prompt from the large-language model, the response comprising a second classification of the call; and in response to the second classification meeting a criterion, initiating an action at the telecommunications network.

11. The apparatus of claim 10, wherein the second transcript is a transcript at a later time than the first transcript in the same call, and wherein the second classification is an updated classification of the call relative to the first classification.

12. A computer-implemented method for classifying a fraud level of a voice call that is in progress in a telecommunications network, comprising:

accessing the voice call;

for a specified segment of the voice call, converting a sample of the voice call to text, the text comprising a transcript of at least a portion of the voice call;

computing an embedding vector of the transcript;

searching a database of embedding vectors for a first embedding vector with a defined degree of similarity to the embedding vector of the transcript, each embedding vector representing an example text associated with a known classification of a fraud level of the example text;

constructing a first prompt, the first prompt comprising:

an instruction directed to a conversational large-language model, the instruction instructing the conversational large-language model to classify a fraud level of the call represented by the transcript using a first example;

the transcript;

the first example, the first example comprising:

an example text represented by the first embedding vector; and the known classification associated with the example text represented by the first embedding vector;

prompting the conversational large-language model with the first prompt;

receiving a response to the first prompt from the conversational large-language model, the response comprising a classification of a fraud level of the call; and in response to the classification of the fraud level of the call indicating that the call is fraudulent above a defined level, initiating an action at the telecommunications network, the action comprising at least one of: sending a message to a user associated with the call, terminating the call, and interjecting an audio message into the call.

13. A computer-implemented method for classifying a call in a telecommunications network, comprising:

accessing a transcript of the call;

computing an embedding vector of the transcript;

searching a database of embedding vectors for a first embedding vector with a defined degree of similarity to the embedding vector of the transcript, each embedding vector representing an example text associated with a known classification;

constructing a first prompt, the first prompt comprising:

an instruction directed to a large-language model, the instruction instructing the large-language model to classify the call represented by the transcript using a first example;

the transcript;

the first example, the first example being:

an example text represented by the first embedding vector; and the known classification associated with the example text represented by the first embedding vector;

prompting the large-language model with the first prompt;

receiving a response to the first prompt from the large-language model, the response comprising a classification of the call; and in response to the classification meeting a criterion, initiating an action at the telecommunications network.

14. The method of claim 13, wherein the call is a voice call that is in progress in the telecommunications network, and wherein accessing the transcript of the call comprises accessing the voice call and, for a specified segment of the voice call, converting a sample of the voice call to text.

15. The method of claim 14, wherein accessing the voice call comprises accessing only media flow of the voice call.

16. The method of claim 13 wherein the classification is one of: whether the call is fraudulent or not, and a probability of the call being fraudulent.

17. The method of claim 13, wherein the action at the telecommunications network comprises at least one of:

recommending a remedial action to lower a risk associated with the classification of the call, performing a remedial action to lower a risk associated with the classification of the call, sending a message to a user associated with the call, terminating the call, and interjecting an audio message into the call.

18. The method of claim 13, wherein the large-language model is a generative pre-trained transformer model.

19. The method of claim 13, wherein the embedding vector of the transcript is computed using a neural network encoder, and wherein the embedding vector of the transcript is in an embedding space that is the same embedding space as the first embedding vector.

20. The method of claim 13, further comprising:

searching in the database of embedding vectors for a second embedding vector with a defined degree of similarity to the embedding vector of the transcript, wherein the instruction of the first prompt is an instruction instructing the large-language model to classify the call represented by the transcript further using a second example, and wherein the first prompt further comprises the second example, the second example being a second example text represented by the second embedding vector and the known classification associated with the second example text represented by the second embedding vector.

* * * * *